United States Patent [19]

Demarest, Jr.

[11] 3,940,531

[45] Feb. 24, 1976

[54] STAIN DECORATED GLASS-CERAMIC ARTICLE

[75] Inventor: Henry M. Demarest, Jr., Natrona Heights, Pa.

[73] Assignee: PPG Industries, Inc., Pittsburgh, Pa.

[22] Filed: Sept. 3, 1974

[21] Appl. No.: 502,575

Related U.S. Application Data

[62] Division of Ser. No. 340,513, March 12, 1973, Pat. No. 3,852,052.

[52] U.S. Cl. ............... 428/207; 428/212; 428/213; 428/335; 428/336; 428/332; 428/410; 428/432; 428/434

[51] Int. Cl.² ..................... B32B 7/02; B32B 17/00

[58] Field of Search ........ 161/165, 164, 196; 65/30, 65/33, 65 A, 134; 428/410, 434, 432, 207, 212, 213, 332, 335, 336

[56] References Cited

UNITED STATES PATENTS

| 2,920,971 | 1/1960 | Stookey | 65/33 |
|---|---|---|---|
| 3,022,177 | 2/1962 | Fitch | 117/130 R |
| 3,083,551 | 4/1963 | Pilkington | 161/164 |
| 3,216,834 | 11/1965 | Fitch | 117/33.3 |
| 3,266,912 | 8/1966 | Murphy | 117/124 C |
| 3,313,644 | 4/1967 | Morrissey | 65/30 R |
| 3,468,745 | 9/1969 | Navez | 161/164 |
| 3,625,718 | 12/1971 | Petticrew | 106/52 |

*Primary Examiner*—George F. Lesmes
*Assistant Examiner*—Ellis P. Robinson
*Attorney, Agent, or Firm*—Dennis G. Millman; William J. Uhl

[57] ABSTRACT

A method for producing decorated glass-ceramic articles is disclosed. The method involves contacting a surface of a crystallizable glass with molten tin and thereafter applying to the tin-contacting surface a stain decorating composition. The article is then fired at a temperature such that the glass simultaneously crystallizes and the stain diffuses into the article to form the decoration.

1 Claim, No Drawings

STAIN DECORATED GLASS-CERAMIC ARTICLE

This is a division of application Ser. No. 340,513, filed Mar. 12, 1973, now U.S. Pat. No. 3,852,052.

BACKGROUND OF THE INVENTION

1. Field of the Invention

This invention relates to the production of decorated glass-ceramic articles.

2. Brief Description of the Prior Art

Glass-ceramics are produced through the controlled crystallization of glass. A glassforming batch to which a nucleating agent is added is first melted and the melt then cooled to form a glass article of the desired shape. The glass article is then subjected to a crystallizing heat treatment in which the glass is first heated to a temperature in the vicinity of its annealing point to induce nucleation. The nucleated article is then heated to a higher temperature to cause the growth of crystals on the nuclei. The glass-ceramic article is composed of relatively uniformly fine-grain crystals dispersed in a glassy matrix, the crystals comprising the predominant portion of the article. The physical properties exhibited by the glass-ceramic article normally are very different from those exhibited by the original glass; the principal differences being that the glass-ceramics have greater mechanical strength, better thermal shock resistance and lower electrical conductivity, making glass-ceramics useful for dinnerware, cooking surfaces, electrical insulators and other domestic and technical applications. Glass-ceramics have been described in detail in U.S. Pat. No. 2,920,971 to S. D. Stookey.

With the increasing prominance and importance of glass-ceramic materials, it has become desirable and necessary to decorate articles made from such materials. For example, attractive floral decorations on dinnerware makes the articles more appealing to look at and easier to sell. Also, there is a need to decorate glass-ceramic cooking surfaces to mark the location of heaters under the surface.

The art of decorating ceramic articles in an ancient one, with evidence that glazing of lustrous decorations onto ceramics was common in the Persian Empire. A variety of ceramic decorating techniques have been developed during the long history of the art. Colorants in the form of ceramic glazes, particularly colored spinels, have been coated onto glass-ceramic articles, and colorants in the form of stain decorating compositions have also been used. Stain decorating compositions are different from the glazes in that in stain decorating the colorant migrates into the crystal matrix of the glass-ceramic, whereas in glazing the colorant remains on the surface. By far the most popular decorating compositions are the stain decorating compositions. The ceramic glazes have high coefficients of thermal expansion and normally cannot be fired onto low-expansion glass-ceramic bodies without severe crazing and peeling. Stain decorations, on the other hand, in which the colorant diffuses into the body of the glass-ceramic, are far more durable.

Application of stain decorating to glass-ceramic is accomplished by mixing a colorant such as platinum resinate with a flux such as a bismuth compound and adding the mixture to a vehicle such as an oil, alcohol or water, and then applying this composition to the surface of a crystallizable glass article and firing the article to simultaneously crystallize the glass and to fix the color to the surface. Methods for decorating glass-ceramic articles using colorant stains are described in U.S. Pat. No. 3,266,912 to Murphy and U.S. Pat. No. 3,313,644 to Morrissey.

It has been found in stain decorating glass-ceramics that it is extremely difficult to decorate compositions which are free of arsenic and antimony oxides. Arsenic and antimony oxides have been traditionally used in glass compositions as fining agents and act to remove entrapped bubbles of glass which have been generated during the melting of the batch ingredients. However, arsenic and antimony oxides present numerous disadvantages in melting crystallizable glass compositions. Crystallizable glass compositions require rather high melting temperatures on the order of about 200° to 300°F. above the melting temperature of conventional soda-lime-silica glass. To reach these high melting temperatures, it is desirable to supply an electrical source of heat in addition to the conventional form of heating in which oil or gas streams are burned above the glass melt and the heat is conveyed downwardly into the glass mass. The electrical source of heating is direct resistance heating and involves passing an alternating electric current between electrodes usually made of graphite or molybdenum which are immersed in the glass melt. Glass compositions containing arsenic and antimony oxides attack the electrodes making electric melting impractical for such compositions. Removing arsenic and antimony oxides from the compositions, although solving the electrode problem, creates another problem in that crystallizable glass compositions free of the oxides cannot be satisfactorily stain decorated. The resultant stain decoration is fuzzy and very faint.

SUMMARY OF THE INVENTION

The invention provides a method for stain decorating a glass-ceramic article which has been made from a crystallizable glass composition which is substantially free of arsenic and antimony oxides. The method involves a first contacting of the crystallizable glass with molten tin, preferably by floating the glass on the top of a molten tin bath, for a sufficient period of time so that tin will diffuse into the tin-contacting glass surface and preferably for a sufficient period of time in an enclosed atmosphere so that tin will diffuse into all the major surfaces. The glass is then separated from the tin and the stain decorating composition containing a colorant is applied to a selected portion of a surface of the crystallizable glass into which tin has diffused. The glass is then heated to a temperature sufficient to simultaneously crystallize the glass and to cause the colorant to penetrate and to stain decorate the surface of the glass.

DETAILED DESCRIPTION

In carrying out the invention, a batch of glass-making ingredients consisting essentially of silica, alumina, lithia and a nucleating agent such as titania are first mixed together and thereafter melted to dissolve and react various ingredients. Glass compositions suitable for producing glass-ceramic articles are well known in the art and are disclosed, for example, in U.S. Pat. No. 2,920,971 to Stookey and U.S. Pat. No. 3,625,718 to Petticrew. The glass compositions are preferably substantially free or arsenic and antimony oxides which thereby permits the use of electric melting. By substantially free of arsenic and antimony oxide is meant that no arsenic or antimony compounds are added to the batch ingredients and that any arsenic and antimony oxide which should show up in the final glass composition is due to an impurity present in the batch ingredients and in all instances will be less than 0.02 percent by weight based on total weight of the glass composition.

After the batch glass-making ingredients have been uniformly mixed with one another, the batch is charged, usually on a continuous basis, to a furnace or tank where the glass is melted and fined. The temperatures for melting and fining of crystallizable glasses are higher than the melting and fining temperatures of conventional soda-lime-silica glasses. For example, melting and forming temperatures of crystallizable glass compositions are about 3100°F., whereas conventional soda-lime-silica glasses are melted and fined at temperatures of about 2700°F.

To homogeneously melt and fine the crystallizable glass compositions of this temperature, it has been found desirable to provide an electric melting source in addition to the usual source of heat in which gas streams are burned above the glass melt and the heat is conveyed downwardly into the glass mass. Conventionally, electric melting can best be used by placing the electrodes through the bottom or sides of the tank underneath the melted batch.

Electric melting can, of course, be used as the sole source of heat for melting and fining of the glass, in which case additional electrodes have to be selectively positioned throughout the tank. However, economic considerations indicate that electric melting be used in conjunction with the standard convection-type of heating.

After the crystallizable glass has been suitably melted and fined, usually for a period of about 12 to 24 hours, it is shaped by blowing, pressing or rolling. The glass article is then contacted with molten tin. By molten tin is meant a molten tin-containing melt which may contain other ingredients such as is the case with various tin alloys. The most convenient way of contacting the glass with a molten tin-containing melt is to float the crystallizable glass on the upper surface of a molten tin or tin alloy bath. The crystallizable glass can be floated on the molten tin bath in essentially two ways. Preferably, the crystallizable glass is first formed into a shape-retaining article as described above and then floated on top of a molten tin bath. Thus, for example, the glass could be formed into a continuous ribbon by passing it between water-cooled rolls as it is discharged from the furnace such as is disclosed in U.S. Patent application Ser. No. 222,627, filed Feb. 1, 1972, by Henry M. Demarest, Jr. now U.S. Pat. No.3,771,984. After the glass has been formed, and while it is still hot, i.e. at a temperature of about 1,400°–1,600°F., it could then be passed onto a molten tin bath of annealing. The annealing temperature should be controlled so that the glass will not crystallize. Although some nucleation may occur, conditions should be controlled so that nucleation and crystallization are minimized. This annealing temperature should be below the nucleation and crystallization temperatures of the glass. Also, quite obviously, the glass could first be annealed by conventional thermal air treatment in a lehr and then subsequently contacted with the molten tin bath. Further, it is within the scope of this invention that the necessary contact with the molten tin could be achieved by directly forming the crystallizable glass to a shape-retaining article on the molten tin bath. Techniques for forming glass sheets on the molten tin bath are well known in the art and are disclosed, for example, in U.S. Pat. No. 3,083,551 to Pilkington.

The crystallizable glass should be contacted with the molten tin bath for a period of time and at a temperature so that sufficient tin will be incorporated into the glass surface so that the crystallizable glass will be susceptible to subsequent stain decorating. The length of time the crystallizable glass has to be in contact with the molten tin to achieve the desired tin concentration and penetration will depend on many variables, such as the temperature of the tin bath, the percentage of oxygen in the atmosphere, whether the crystallizable glass is formed on a molten tin bath on whether the crystallizable glass is contacted with molten tin after being formed, and on whether the tin-contacting or the opposed surface is to be stain decorated. In gneral, the glass should be contacted with the molten tin at a glass temperature of about 1,000°–2,500°F. for at least 2 minutes, and preferably in a reducing atmosphere. Much longer contact times, up to one hour or longer, can be used but are not necessary, although longer contact times should be used with lower glass temperatures.

It is estimated based on electron microprobe analysis of various crystallizable glass samples which have been contacted with molten tin, that the tin should penetrate at least 5 microns, preferably at least 10 microns, into the surface of the glass to make the glass surface susceptible to stain decorating.

It has been found in the practice of this invention that it is not necessary in all cases that the stain decorating composition be applied to tin-contacting surface of the crystallizable glass. If the glass is contacted with a molten tin bath in an enclosed environment, such as disclosed in the aforementioned U.S. Pat. No. 3,083,551 to Pilkington, it is known that tin will penetrate the upper surface of the glass which is not in contact with the tin. Therefore, this surface would be acceptable for stain decorating as long as it had the required concentration and penetration of tin in the surface. What is necessary is that tin be diffused into the surface layers of the crystallizable glass to be stain decorated. Whether or not the surface to be decorated has been in contact with the molten tin is not the critical factor.

After the glass has been contacted with the tin for a sufficient period of time to achieve the proper penetration and concentration, the glass is separated from the tin bath and made ready for stain decorating.

The stain decorating is accomplished by applying to a selected portion of the tin-contacting surface of the glass the stain decorating composition. The stain decorating composition comprises a coloring agent and, optionally, a fluxing agent dissolved in an oil base. In addition, a diluent to improve the uniformity of the resultant coloration may optionally be used. The coloring agents are preferably selected from the precious metals, such as platinum, palladium, silver and gold.

Decorating compositions containing platinum for use on glass-ceramics are known in the art and have been described in Chemnitius Spechsaal 60,226 (1927); such compositions contain a platinum resinate prepared by causing a platinum salt to react with a sulfurized terpene such as sulfurized Venetian terpene. The platinum resinate is dissolved in vehicles such as oils of lavender, rosemary, aniseed, sassafras, wintergreen and fennel, turpentine, various terpenes, nitrobenzene and the like. Other platinum-containing decorating compositions are platinums containing halogeno, platinous, mercaptide-alkyl sulfide complexes such as are described in U.S. Pat. No. 3,022,177 to Fitch.

It is well known in the art that a palladium compound may be prepared in the same manner as the above-mentioned platinum resinate. Other palladium-containing decorating compositions are the bis-thioether palladious salt coordination compounds which are described in U.S. Pat. No. 3,216,834 to Fitch.

Besides a colorant, a fluxing agent such as resinates of bismuth or chromium may optionally be used in the staining composition. The function of the fluxing agent is not completely understood in the stain decorating art, although their presence is supposed to improve the appearance of the decoration.

The above-recited glass coloring agents may be used in concentrated form or they may be diluted by mixing them with an inert powder such as $TiO_2$ and $ZrO_2$. Uniform coloration may be obtained with amounts of diluent up to about 90 percent by weight based on weight of the colorant plus diluent, but intensity of color diminishes with the higher percentage of diluent.

The staining composition is usually applied to a portion of the surface of the crystallizable glass by any suitable means or procedure which produces an even, uniform coating, such as by spraying, brushing or screen stenciling. Of the several methods available for applying decorations to glass, screen stenciling is preferred. Decorating screens, made of 230 mesh perlon, supported in wooden frames can be placed over the glass and the decorating material placed on the screen. A rubber or plastic squeegee is pulled across the screen, forcing the decorating material through the screen openings and into the glass surface. Spacer blocks should be placed under the screen frame so that the screen falls within three-sixteenths of an inch from the glass when it is over the glass. If the screen is too close or too far from the glass, poor decorations will result. The decorating composition must be of the correct viscosity for good screening, about 50,000 centipoises (20°C.). If the material is too thick, a thinner, such as pine oil, can be added to reduce the viscosity. After the decorating composition has been screen stenciled onto the glass, the glass is air dried at room temperature for about 30 minutes before the crystallizing heat treatment, which involves heating the article to a temperature to simultaneously crystallize the glass and to cause the colorant to penetrate the surface of the glass in the portion where the stain decorating composition was applied.

For the heat treatment, the decorated article is normally placed in an oven, kiln or the like and the temperature steadily raised over a period of about 3-4 hours from about room temperature to about 1,300°F. The temperature is maintained at about 1,300-1,325°F. for approximately 8 hours to initiate nucleation of crystallization sites within the glassy body of the article being treated. The temperature is then raised at the rate of about 75°F. per hour to about 1,850°F. and held there for about 3-4 hours to cause the glass to crystallize throughout the body of the article and to simultaneously integrate the colorant and the flux into the crystalline matrix. The temperature is then reduced as rapidly as possible consistent with avoiding damage to the refractories and structural members of the heating chamber. After the article is cooled, a slight residue of the diluent is removed and the article is cleaned.

The resulting decorated article should be opaque and milky white. The decoration should be uniform in appearance and a sharp demarkation between the areas colored by the decoration and the white body of the glass-ceramic should be apparent. The depth of coloration should be at least about 1 mil and has been found to be in the range of 1 to 40 mils as determined by cutting through the stain decoration and measuring the depth of the stain with a measuring eyepiece such as a 50X microscope.

In carrying out the invention, it should be realized that the decorating composition should be applied to the glass body before it has been crystallized, because crystallization of the glass and coloration of the semi-crystalline body are thereby accomplished at the same time.

DESCRIPTION OF THE PREFERRED EMBODIMENT

To a commercial-size glass tank capable of containing about 35 tons of molten glass and designed for continuous melting and forming are added on a continuous basis at the feed end of the tank the following well-mixed batch ingredients which were free of arsenic and antimony oxides.

| Ingredient | Parts by Weight |
| --- | --- |
| Silica | 700 |
| Hydrated alumina | 296 |
| Lithium carbonate | 83 |
| Zinc zirconium silicate | 31 |
| Zinc oxide | 10.5 |
| Titanium dioxide | 15.0 |
| Lithium fluoride | 13.5 |
| Soda ash | 4.0 |
| Lithium sulfate | 6.0 |
| Potassium carbonate | 2.5 |
|  | 1161.5 |
| Cullet[1] | 1360 |

[1]The glass cullet has the following composition, expressed as percent by weight: $Na_2O$, 0.31%; $Li_2O$, 4.13%; $F^-$, 0.27%; $SiO_2$, 70.92%; $Al_2O_3$, 19.46%; $ZrO_2$, 1.54%; ZnO, 1.53%; $Fe_2O_3$, 0.05%; $TiO_2$, 1.56% and $K_2O$, 0.18%.

The glass batch is melted and fined for about 8 hours at a temperature of about 3,200°F. (melting zone) to 2,900°F. (fining zone). In the melting zone, molybdenum electrodes, extending through the sides and bottom of the tank, are positioned under the melted batch. These electrodes provide a booster source of heat to the hot flames combustion products which pass through ports opening into the melting tank above the level of glass. The molten glass is removed from the tank at the working zone at a temperature of 2,600°F. The molten glass is then continuously formed between a pair of heavy cast iron, water-cooled rolls. As the glass passes from the water-cooled forming rolls, the surfaces have become sufficiently chilled to form a more or less self-sustaining sheet or ribbon, even though the body of the glass is still very hot.

The formed sheet then enters the annealing lehr at a temperature of about 1,500°F. Consequently, in this area, the glass loses heat rapidly and the temperature falls from about 2,300°F. The annealing lehr is essentially an enclosed molten tin bath which is under a reducing atmosphere of 95 percent nitrogen and 5 percent hydrogen gas. The temperature of the lehr is maintained by the heat loss of the glass and convection heaters and is graduated, being about 1,500°F. at the entrance and tapering to about 95°F. at the end. The overall length of the lehr is about 400 feet. Because the glass is less dense than the molten tin, it floats on top of the tin bath.

After annealing, the glass is rapidly cooled to room temperature and removed from the lehr, inspected and cut to size. The glass at this stage should have a thickness of about 0.2 inch and have the following composition (exclusive of tin) as determined by wet chemical analysis and X-ray fluorescence.

| Component | Percent by Weight |
|---|---|
| $SiO_2$ | 70.67 |
| $Al_2O_3$ | 19.39 |
| $Li_2O$ | 4.13 |
| $TiO_2$ | 1.56 |
| $ZrO_2$ | 1.54 |
| ZnO | 1.53 |
| $Na_2O$ | 0.31 |
| $K_2O$ | 0.18 |
| $F^-$ | 0.27 |

Electron microprobe analysis should indicate that the tin is principally located in the tin-contacting surface of the glass. The tin should have penetrated to the extent of at least 5 mils into the surface of the glass.

After the glass was annealed on the tin bath, it was inspected, cut to kitchen range top size and set aside for stain decoration.

A stain decorating composition comprising 50 grams of a colorant and colorant modifier which is known in the art as "dark brown" A-1454 and available from Engelhard Industries Inc. containing 2.26 weight percent palladium and 0.42 weight percent bismuth dissolved in an essential oil is mixed with 450 grams of titanium dioxide diluent. The mixture of colorant and diluent is then further mixed with pine oil to make a paste having a volume of about 1 pint. The paste is mixed in a roller mill, running through about 3 times. Additional pine oil is mixed into the paste until the viscosity is about 50,000 centipoises.

A screen made of 230 mesh perlon supported on a wooden frame and having an open floral design was then placed on the tin-contacting surface of the crystallizable glass article to locate the burner areas. Spacers were placed under the frame to space the screen about three-sixteenths of an inch from the crystallizable glass surface. The open design of the screen is sized to compensate for shrinkage of the crystallizable glass during heat treatment. The decorating paste as described above is placed on the screen, and a polyurethane squeegee is drawn across the screen forcing the paste through the screen openings onto the crystallizable glass. The paste, in its decorative configuration on the crystallizable glass article, is then air dried for about 30 minutes. While drying is not absolutely necessary, it is done to eliminate any stickiness that could result in dirt adherence to the design while placing the article in the heat treatment chamber. The article is then heat treated to crystallize the glass-ceramic and to integrate the colorant into the crystal matrix of the resultant glass-ceramic article.

For heat treating, the glass is stored on racks or the like and put into a kiln. The temperature of the kiln is raised from room temperature to 1,325°F. (nucleation temperature) over the period of 3 hours and held at this temperature for 8 hours. The glass is then slowly heated at a rate of about 75°F. per hour to a temperature of about 1850°F. and held at this temperature for 4 hours. The kiln temperature is then lowered at a rate of 150°F. per hour to 1,300°F. and then the kiln is slowly cooled to room temperature. The glass is removed from the kiln and inspected. Upon visual inspection, the glass should be opaque in appearance and the decoration dark gray with well defined edges. X-ray diffraction analysis should indicate that the glass has crystallized to about 95 percent beta-spodumene solid solution. The palladium stain should have penetrated to a depth of about 8 mils into the glass-ceramic surface, and a slight residue of $TiO_2$ should appear on the glass surface.

The durability of the coloration should be excellent as determined by:

a. 100 rubs with a household cleaning powder,
b. 25 rubs with a gold eraser,
c. 25 rubs with an aluminum bar,
d. 3,000 revolutions with a taber abraser-CS-10F calibrate wheel
e. 15 minutes contact 10 percent citric acid
f. 15 minutes contact 10 percent sulfuric acid
g. 15 minutes contact 10 percent sodium hydroxide
h. firing at 1,300°F. for 16 hours with cooking oil in contact
i. heating at 1,300°F. maintained for 168 hours.

No change in design color or quality should be observed except some lightening associated with the taber abraser test. Upon repeating the above experiment, but without annealing on a molten tin bath, but annealing in a conventional gas-fed lehr, no stain decoration would be obtained.

EXAMPLES I TO IX

The following examples show the effect of various staining compositions on arsenic and antimony-free crystallizable glasses which have, and have not, been floated on a tin bath. For a control, a crystallizable glass containing antimony oxide was also evaluated for staining. The control glass (Glass C) had the following composition, on an oxide basis:

| Component | Percent by Weight |
|---|---|
| $Na_2O$ | 0.29 |
| $Li_2O$ | 4.05 |
| $F^-$ | 0.24 |
| $SiO_2$ | 70.84 |
| $Al_2O_3$ | 19.45 |
| $ZrO_2$ | 1.52 |
| ZnO | 1.47 |
| $Fe_2O_3$ | 0.05 |
| $TiO_2$ | 1.58 |
| $K_2O$ | 0.18 |
| $As_2O_3$ | 0.02 |
| $Sb_2O_3$ | 0.30 |

The arsenic and antimony-free glasses had the following compositions, on a weight basis:

| Component | Percent by Weight Glass A | Glass B |
|---|---|---|
| $Na_2O$ | 0.54 | 0.17 |
| $Li_2O$ | 3.82 | 4.15 |
| $F^-$ | 0.10 | 0.22 |
| $SiO_2$ | 71.07 | 70.20 |
| $Al_2O_3$ | 19.57 | 18.76 |
| $ZrO_2$ | 1.48 | 1.31 |
| ZnO | 1.74 | 1.93 |
| $Fe_2O_3$ | 0.03 | 0.04 |
| $TiO_2$ | 1.54 | 3.00 |
| $K_2O$ | 0.10 | 0.19 |
| $As_2O_3$ | 0.00 | 0.00 |

-continued

| Component | Percent by Weight | |
|---|---|---|
| | Glass A | Glass B |
| $Sb_2O_3$ | 0.01 | 0.01 |

Three button-shaped glass samples, one of each composition, each having a diameter of about 2½ inches and a thickness of about 0.35 inch, were treated with various stain decorating compositions without first contacting the glass samples with molten tin. The stain decorating compositions were prepared as follows:

| Staining Composition No. | Coloring Agent (Resinate) | Parts by Weight | Diluent | Parts by Weight |
|---|---|---|---|---|
| 1 | Palladium | 5 | $TiO_2$ | 95 |
| 2 | Platinum | 5 | $TiO_2$ | 95 |
| 3 | Gold | 5 | $TiO_2$ | 95 |
| 4 | Silver | 5 | $TiO_2$ | 95 |
| 5 | Nickel | 10 | $TiO_2$ | 90 |
| 6 | Cobalt | 10 | $TiO_2$ | 90 |
| 7 | Copper | 10 | $TiO_2$ | 90 |
| 8 | Iron | 15 | $TiO_2$ | 85 |
| 9 | Chromium | 15 | $TiO_2$ | 85 |

The coloring agents were mixed with pine oil to form a paste having a viscosity of about 50,000 centipoises at 20°C. The paste was then applied to the various glass samples with a brush in the form of a fine line. In all, nine lines, one representing each staining composition, was applied to each of the glass samples.

After the stain decorating compositions were applied to the crystallizable glass samples, the glass was air dried for 30 minutes and then put in an oven for a crystallizing heat treatment. The crystallizing heat treatment was conducted for the time and temperature described above in the preferred embodiment of the invention. The glass was then removed from the oven and inspected. Upon visual inspection, all the glass samples were found to be opaque in appearance and upon X-ray diffraction analysis, were found to be crystallized to at least 95 percent by weight beta-spodumene solid solution. The results of the stain decorations are reported in Table I below.

Table I

Stain Decoration Results on Arsenic and Antimony-Free Glasses

| Staining Composition No. | Stain Decoration | | |
|---|---|---|---|
| | Glass A | Glass B | Control |
| 1 (Pd) | no decoration | no decoration | dark gray decoration |
| 2 (Pt) | do. | do. | do. |
| 3 (Au) | do. | do. | no decoration |
| 4 (Ag) | do. | do. | do. |
| 5 (Ni) | light gray decoration | light gray decoration | light gray decoration |
| 6 (Co) | dark blue decoration | dark blue decoration | dark blue decoration |
| 7 (Cu) | no decoration | no decoration | no decoration |

Table I-continued

Stain Decoration Results on Arsenic and Antimony-Free Glasses

| Staining Composition No. | Stain Decoration | | |
|---|---|---|---|
| | Glass A | Glass B | Control |
| 8 (Fe) | do. | do. | do. |
| 9 (Cr) | do. | do. | do. |

The depth of the stains ranged from 1 mil for the light gray nickel stain to 34 mils for the dark gray platinum stain.

The above series of experiments were repeated to samples A and B with the exception that the samples were first floated on a molten tin bath before the staining compositions were applied. In each of these experiments, a flat disc of solid tin having a diameter of about 3½ inches and a thickness of about three-fourths of an inch was placed in the bottom of a 4 inch diameter lavasil crucible. A piece of glass having a weight of about 40 grams was placed on top of the tin and a 2½ inch carbon ring was also placed on top of the tin surrounding the glass piece. The purpose of the carbon ring was to prevent the glass upon heating from flowing beyond the confines of the ring and contacting the sides of the lavasil crucible. After the glass and the carbon ring were in place, the crucible was purged with a 95:5 mixture of nitrogen and hydrogen gas at a rate of about 10 cubic feet per hour to create a reducing atmosphere in the crucible. The crucible, with continued purging, was then inserted in a furnace which was preheated to a temperature of about 2550°F. The crucible was contained in the oven until the temperature inside the crucible reached about 2350°F. At this temperature the tin became molten and the glass sample liquified somewhat and flowed upon the molten tin until it contacted the carbon ring. The samples were contained in the furnace for an additional 14 minutes at a furnace temperature of 2550°F. The crucible was then removed from the furnace and slowly cooled to room temperature while continuously purging with the reducing gas. The glass sample was then removed from the crucible and coated with the various stain decorating compositions as described above on both the tin-contacting (lower) and upper surfaces. After the stain decorating composition was applied to the crystallizable glass samples, the coated glass was air dried for 30 minutes and put in an oven for a crystallizing heat treatment. The crystallizing heat treatment was conducted for the time and temperature described above in the preferred embodiment of the invention. The glass was then removed from the oven and inspected. Upon visual inspection, all the glass samples were found to be opaque in appearance and upon X-ray diffraction analysis, were found to be crystallized to at least 95 percent by weight beta-spodumene solid solution. The results of the stain decorations are reported in Table II below.

Table II

Stain Decoration Results on Arsenic and Antimony-Free Glasses Which Have Been Floated on a Molten Tin Bath

| | Stain Decoration | | | |
|---|---|---|---|---|
| | Glass A | | Glass B | |
| Staining Composition No. | Bottom or Tin-Contacting Surface | Top Surface | Bottom or Tin-Contacting Surface | Top Surface |
| (Pd) | dark gray decoration | dark gray decoration | dark gray decoration | dark gray decoration |
| 2 (Pt) | do. | do. | do. | do. |
| 3 (Au) | dark brown | dark brown | dark brown | dark brown |

Table II-continued

Stain Decoration Results on Arsenic and Antimony-Free Glasses Which Have Been Floated on a Molten Tin Bath Stain Decoration

| Staining Composition No. | Glass A Bottom or Tin-Contacting Surface | Glass A Top Surface | Glass B Bottom or Tin-Contacting Surface | Glass B Top Surface |
| --- | --- | --- | --- | --- |
| 4 (Ag) | decoration dark gray decoration | decoration light gray decoration | decoration dark gray decoration | decoration light gray decoration |
| 5 (Ni) | light gray decoration | do. | light gray decoration | do. |
| 6 (Co) | dark blue decoration | dark blue decoration | dark blue decoration | dark blue decoration |
| 7 (Cu) | no decoration | no decoration | no decoration | no decoration |
| 8 (Fe) | do. | do. | do. | do. |
| 9 (Cr) | do. | do. | do. | do. |

In the above results, the depth of penetration of the darker stains was about 5 to 20 mils and the lighter stains about 1 to 10 mils.

I claim:

1. A stain-decorated glass-ceramic article comprising:

a solid body of fine-grain crystals dispersed in a glassy matrix, the crystals forming the major portion thereof, and including silica, alumina, lithia, and a crystal-nucleating agent, but substantially free of arsenic and antimony oxides;

a tin-penetrated zone extending into said body at least 5 microns from at least one surface of said body and in which the tin ion concentration is greater than that in interior portions of said body;

a colorant-penetrated zone extending into said body from 1 to 40 mils from portions of said at least one surface of said body and in which the concentration of colorant, selected from the group consisting of platinum, palladium, silver, and gold, is greater than in interior portions of said body.

* * * * *